(12) United States Patent
Takeuchi

(10) Patent No.: US 10,948,035 B2
(45) Date of Patent: Mar. 16, 2021

(54) BRAKE HALF-CALIPER AND METHOD OF MAKING BRAKE HALF-CALIPER

(71) Applicant: ADVICS North America, Inc., Lebanon, OH (US)

(72) Inventor: Masakazu Takeuchi, Novi, MI (US)

(73) Assignee: ADVICS CO., LTD., Kariya (JP)

( * ) Notice: Subject to any disclaimer, the term of this patent is extended or adjusted under 35 U.S.C. 154(b) by 37 days.

(21) Appl. No.: 16/204,439

(22) Filed: Nov. 29, 2018

(65) Prior Publication Data

US 2020/0173504 A1    Jun. 4, 2020

(51) Int. Cl.
| | | |
|---|---|---|
| *F16D 55/22* | (2006.01) | |
| *F16D 55/00* | (2006.01) | |
| *F16D 55/228* | (2006.01) | |
| *F16D 55/226* | (2006.01) | |

(52) U.S. Cl.
CPC ....... *F16D 55/228* (2013.01); *F16D 55/2262* (2013.01); *F16D 2055/002* (2013.01)

(58) Field of Classification Search
CPC ............... F16D 55/228; F16D 55/2262; F16D 2055/002
USPC ...................................................... 188/73.31
See application file for complete search history.

(56) References Cited

U.S. PATENT DOCUMENTS

| | | | | |
|---|---|---|---|---|
| 5,257,679 | A * | 11/1993 | Weiler .................. | F16D 55/226 188/73.32 |
| 5,706,916 | A * | 1/1998 | Cortes Guasch ..... | F16D 55/224 188/73.38 |
| 5,819,886 | A * | 10/1998 | Null ........................ | B60T 7/203 188/73.41 |
| 6,260,670 | B1 * | 7/2001 | Maehara ............... | F16D 55/228 188/72.5 |
| 7,108,109 | B1 * | 9/2006 | Wilkings ................ | B22C 9/046 188/72.4 |
| 7,874,405 | B2 * | 1/2011 | Blatt ....................... | F16D 55/22 188/73.31 |
| 2003/0178261 | A1 * | 9/2003 | Ciotti ..................... | F16D 55/228 188/73.43 |
| 2005/0061466 | A1 * | 3/2005 | Morais ................. | B22D 31/002 164/76.1 |
| 2007/0045064 | A1 * | 3/2007 | Jedele ................. | F16D 55/2265 188/73.39 |

(Continued)

FOREIGN PATENT DOCUMENTS

| | | |
|---|---|---|
| JP | 11030252 A | 2/1999 |
| JP | 2008075750 A | 4/2008 |

*Primary Examiner* — Bradley T King
*Assistant Examiner* — James K Hsiao
(74) *Attorney, Agent, or Firm* — Buchanan Ingersoll & Rooney PC

(57) ABSTRACT

A disc brake half-caliper includes at least one cylindrical recess formed in a central portion of the half-caliper, the at least one cylindrical recess configured to support a piston for movement in an axial direction, and a pair of bridge portions formed on opposite sides of the central portion. At least one of the bridge portions extends further in the axial direction toward a first side of the disc brake half caliper than the central portion, defines at least one through hole extending therethrough in the axial direction, and terminates on the first side at a flat surface perpendicular to the axial direction, and has at least one cavity formed in the flat surface with a bottom at which the at least one through hole opens.

4 Claims, 5 Drawing Sheets

(56) References Cited

U.S. PATENT DOCUMENTS

| | | | |
|---|---|---|---|
| 2008/0067015 A1* | 3/2008 | Thomas | F16D 55/00 |
| | | | 188/73.31 |
| 2012/0043168 A1* | 2/2012 | Narayanan V | F16D 55/227 |
| | | | 188/72.1 |
| 2012/0325600 A1* | 12/2012 | Ruiz | F16D 65/0075 |
| | | | 188/73.31 |
| 2013/0092481 A1* | 4/2013 | Crippa | F16D 55/228 |
| | | | 188/73.31 |
| 2013/0213747 A1* | 8/2013 | Scotti | F16D 65/0075 |
| | | | 188/73.31 |
| 2013/0264155 A1* | 10/2013 | Huang | F16D 55/228 |
| | | | 188/73.47 |
| 2014/0158483 A1* | 6/2014 | Miyahara | F16D 65/0068 |
| | | | 188/73.47 |
| 2015/0027822 A1* | 1/2015 | Cerutti | F16D 65/0075 |
| | | | 188/73.47 |
| 2016/0184883 A1* | 6/2016 | Arai | B22C 9/064 |
| | | | 188/73.31 |
| 2018/0149219 A1* | 5/2018 | Noh | B22C 9/10 |
| 2018/0187730 A1* | 7/2018 | Lethorn | F16D 65/0068 |
| 2018/0223924 A1* | 8/2018 | Piccoli | F16D 65/0068 |
| 2019/0085919 A1* | 3/2019 | Yang | F16D 65/183 |

* cited by examiner

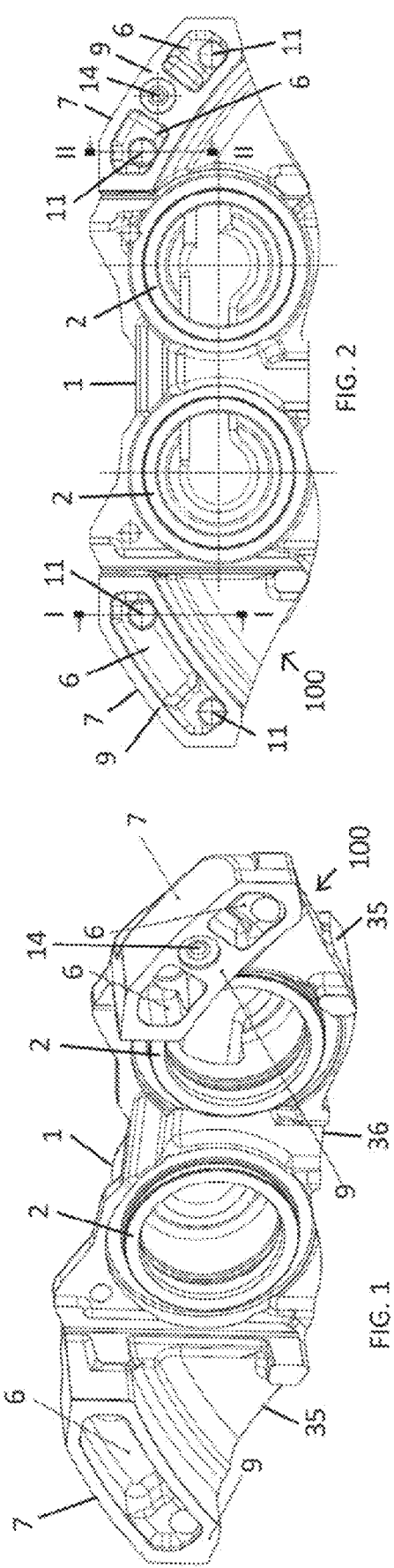
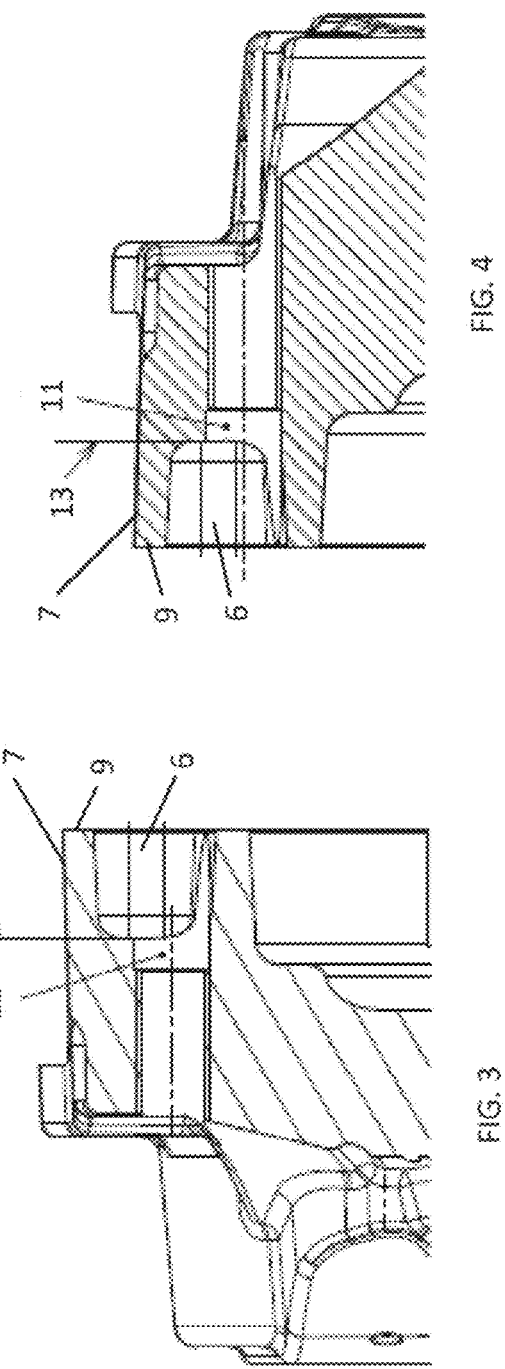

BRAKE HALF-CALIPER AND METHOD OF MAKING BRAKE HALF-CALIPER

TECHNICAL FIELD

The present invention generally relates to a brake half-caliper and a method of making the brake half-caliper.

BACKGROUND DISCUSSION

As the demand for hybrid electric and electric vehicles has increased, so has the need for reducing the weight of the vehicles themselves. Furthermore, reducing the unsprung weight in particular, i.e., the weight not supported by the suspension, can provide significant benefits in performance and efficiency. One vehicle part which provides a significant percentage of the unsprung weight is the brake calipers, which need to be made from iron or another strong but heavy material to adequately handle the braking forces.

The inventor here has discovered however that indiscriminately reducing the size of known brake calipers and/or indiscriminately removing material to produce a lighter brake caliper is not an acceptable solution. A brake caliper of reduced size may not be sufficiently strong to operate in the vehicle braking environment. And removing weight in an arbitrary manner can create other challenges in terms of, for example, casting porosity.

SUMMARY

A disc brake half-caliper according to the present disclosure includes at least one cylindrical recess formed in a central portion of the half-caliper, the at least one cylindrical recess configured to support a piston for movement in an axial direction, and a pair of bridge portions formed on opposite sides of the central portion. Each of the bridge portions extends further in the axial direction toward a first side of the disc brake half caliper than the central portion, defines at least one through hole extending therethrough in the axial direction, and terminates on the first side at a flat surface perpendicular to the axial direction. At least one of the bridge portions has at least one cavity formed in the flat surface with a bottom at which the at least one through hole opens, and a flat surface having an outermost perimeter unbroken by any of the cavities.

A disc-brake caliper according to the present disclosure includes an inner disc brake half-caliper and an outer disc brake half-caliper, each of the inner and outer disc brake half-calipers having the features discussed in the preceding paragraph. Bolts extend through one of the through holes in the inner disc brake half-caliper and one of the through holes of the outer disc brake half-caliper, and the flat surfaces of the outer disc brake half-caliper are in contact with the flat surfaces of the inner disc brake half-caliper.

A method of making a disc brake half-caliper apparatus according to the present disclosure includes supplying molten material into at least one gate of a casting mold, an internal portion of the casting mold defining a disc brake half-caliper comprising having a central portion and a pair of bridge portions formed on opposite sides of the central portion, each of the bridge portions extending further in the axial direction toward a first side than the central portion and terminating on the first side at a surface, and at least one cavity in at least one of the surfaces. The method further includes allowing the molten material to solidify to form the disc brake half-caliper, and forming, in at least one of the bridge portions of the disc brake half-caliper, at least one respective through hole extending therethrough in the axial direction and opening at the bottom of the at least one cavity of the respective bridge portion.

BRIEF DESCRIPTION OF THE DRAWINGS

FIG. 1 illustrates a perspective view of an embodiment of an outer disc brake half-caliper.

FIG. 2 illustrates a side view of the half-caliper of FIG. 1.

FIG. 3 illustrates a cross-sectional view along line I-I of FIG. 2.

FIG. 4 illustrates a cross-sectional view along line II-II of FIG. 2.

DETAILED DESCRIPTION

Figure 5:
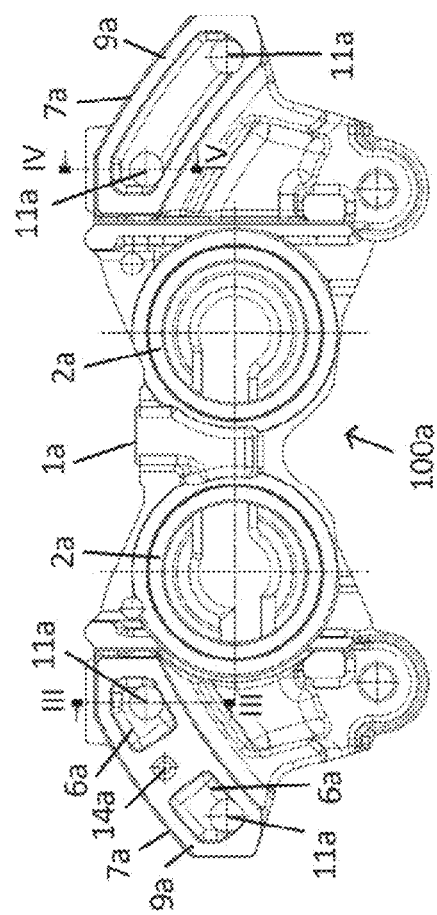
FIG. 5 illustrates a perspective view of an embodiment of an inner disc brake half-caliper.
Figure 6:
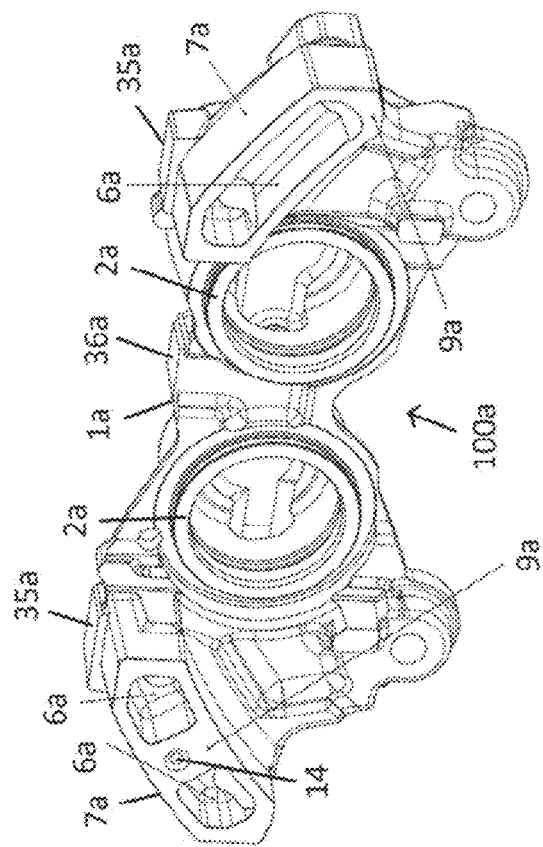
FIG. 6 illustrates a side view of the half-caliper of FIG. 5.
Figure 7:
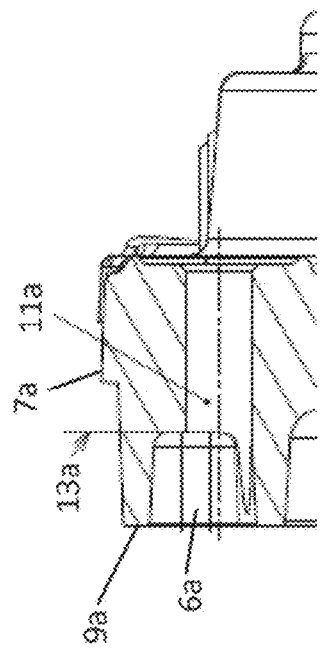
FIG. 7 illustrates a cross-sectional view along line III-III of FIG. 6.
Figure 8:
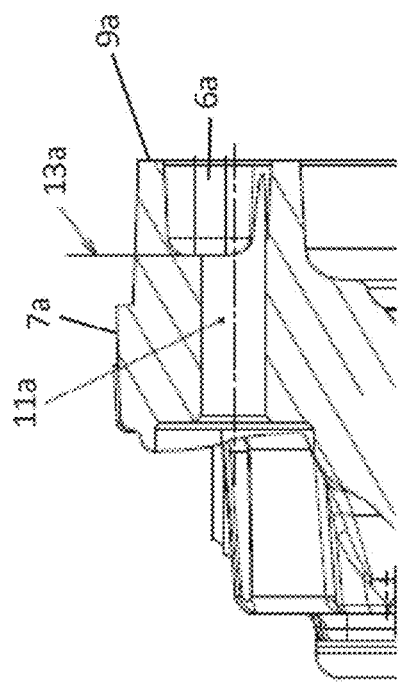
FIG. 8 illustrates a cross-sectional view along line IV-IV of FIG. 6.

FIGS. 1-4 illustrate an embodiment of an outer disc brake half-caliper 100 according to the present disclosure, and FIGS. 5-8 illustrate an embodiment of an inner disc brake half-caliper according to the present disclosure. As discussed in detail below, a pair of bridge portions 7 of the outer disc brake half-caliper 100 mate with a pair of bridge portions 7a of the inner disc brake half-caliper 100a to form a disc brake caliper. The bridge portions 7 and 7a each form a substantial portion of the area taken up by the half-calipers 100 and 100a and so removing unnecessary material from the bridge portions 7 and 7a can result in substantial weight savings. As further discussed in detail below, it has been found that providing cavities 6 and 6a in the flat surfaces 9 and 9a of the bridge portions 7 and 7a can provide substantial weight savings while keeping the bridge portions 7 and 7a sufficiently stiff. Additionally, the casting profile of such bridge portions 7 and 7a is advantageous from the standpoint of avoiding, for example, casting porosity that might otherwise result during fabrication of the half-caliper. That is, during casting of the half-caliper, the casting profile of the bridge portions 7, 7a allows for the portion of the molten metal directly adjacent the casting gate to solidify after the portion of the molten metal defining the cavities, minimizing casting porosity in the bridge portions 7 and 7a, as discussed in more detail below, and resulting in a half-caliper of appropriate strength and construction integrity.

The outer disc brake half-caliper 100 of FIGS. 1-4 includes a central portion 1 and the pair of bridge portions 7 on opposite sides of the central portion 1. At least one cylindrical recess 2 (two in the illustrated embodiment disclosed by way of example) is formed in the central portion 1 and is configured to support a piston for movement in an axial direction. The bridge portions 7 each extend further in the axial direction toward a first side of the half-caliper 100 than the central portion 1. In other words, the bridge portions 7 project from the half-caliper 100 relative to the central portion 1 in the same direction as the pistons will project when installed in the cylindrical recesses 2. Each bridge portion 7 terminates on the first side at a flat surface 9 perpendicular to the axial direction. As discussed in further detail below, the bridge portions 7 extend in this direction so that their flat surfaces 9 can mate with similar flat surfaces of corresponding mating bridge portions on a corresponding inner disc brake half-caliper 100a.

As illustrated in FIGS. 3 and 4, each of the bridge portions 7 also defines at least one through hole 11 extending therethrough in the axial direction. Furthermore, as illustrated in FIGS. 1-4, each of the bridge portions 7 has at least one cavity 6 formed in the flat surface 9 (i.e., the cavity opens to the flat surface), and the through holes 11 each open at a bottom 13 of one of the cavities 6. In particular, in the illustrated embodiment disclosed by way of example, the left-side bridge portion 7 in FIGS. 1 and 2 includes a single cavity 6 having two through holes 11 opening at its bottom 13, while the right-side bridge portion 7 in FIGS. 1 and 2 includes two cavities 6, each with a through hole 11 opening at its bottom 13. By providing such cavities in the flat surfaces 9 of the bridge portions 7 and in the locations of the through holes, the bridge portions 7 can be lightened while maintaining acceptable stiffness of the half-caliper 100. In the illustrated embodiment, both bridge portions 7 of the half-caliper have cavities. However, it is also possible to achieve significant weight savings by providing cavities 6 in only one of the two bridge-portions 7 of each half-caliper.

In the illustrated embodiment, the pistons are actuated by hydraulic fluid introduced into the cylindrical recesses 2 behind the pistons. In order for the hydraulic fluid to be supplied to both the inner and outer half-calipers 100 and 100a, internal fluid passageways 14, which are in communication with the cylindrical recesses 2, and which mate when the inner and outer calipers are secured together, can be provided in at least one bridge portion 7 of each half-caliper 100 and 100a. However, external tubing or piping can instead be used to supply the hydraulic fluid between the half-calipers 100 and 100a. In the embodiment illustrated in FIGS. 1 and 2, there is an internal fluid passageway 14 in the right-side bridge portion 7 in communication with the cylindrical recess 2.

FIGS. 5-8 illustrate the inner disc brake half-caliper 100a configured to be used with the outer disc brake half caliper 100 illustrated in FIGS. 1-4. As with the half-caliper 100, the half-caliper 100a includes a central portion 1a, a pair of bridge portions 7a, cylindrical recess 2a with flat surfaces 9a, cavities 6a with bottoms 13a, through holes 11a, and an internal fluid passageway 14a. In order to cooperate with the half caliper 100, the bridge portions 7a are provided as approximate mirror images of the bridge portions 7. In other words, the right-side bridge portion 7a in FIGS. 5 and 6 includes a single cavity 6a having two through holes 11a opening at its bottom 13a, while the left-side bridge portion 7a in FIGS. 5 and 6 includes two cavities 6a, each with a through hole 11a opening at its bottom 13a, and an internal fluid passageway 14a. Of course, an ordinarily skilled artisan would recognize that other differences outside the scope of the present invention, such as difference pertaining to a connection of one of the half-calipers to the vehicle body, may exist between the two half-calipers.

Figure 9:
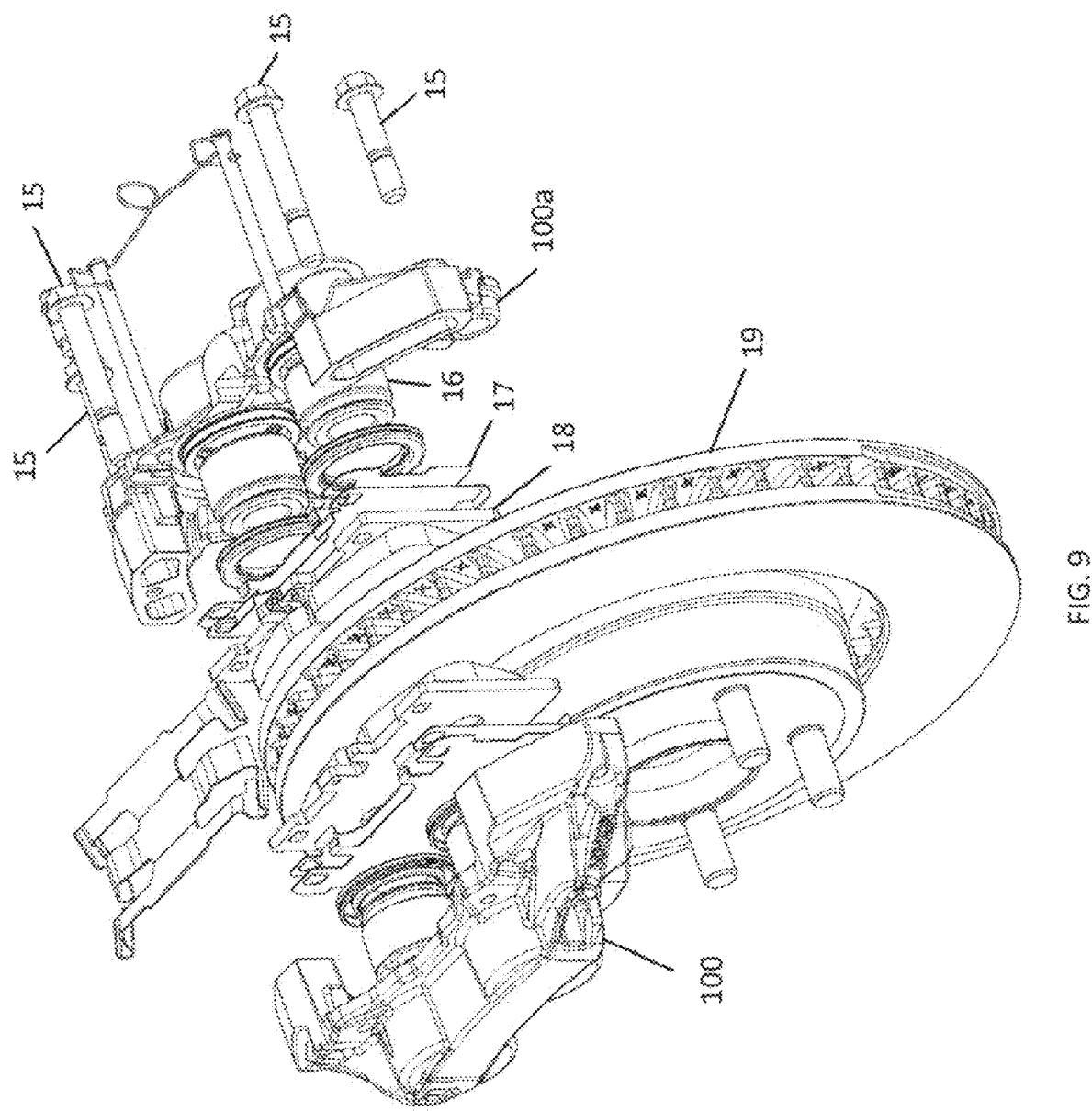
FIG. 9 illustrates an exploded view of a disc brake including the brake half-caliper of FIG. 1 and the brake half-caliper of FIG. 5.

As illustrated in FIG. 9, in uniting the half-calipers 100 and 100a into a single caliper, a plurality of bolts 15 are disposed in the through-holes 11a of the half-caliper 100a from the second side of the half-caliper, and extend through the corresponding through-holes 11 in the outer half-caliper 100, with the flat surfaces 9 of the half-caliper 100 being in contact with and tightened to the flat surfaces 9a of the half-caliper 11a. The through-holes 11 of the half-caliper 100 are female-threaded to mate with the male thread of the respective bolt 15, and the heads of the bolts 15 tighten against the rear surface of the half-caliper 100a. The caliper can be used in an otherwise conventional disc brake, including pistons 16, shims 17, brake pads 18, and a brake disc 19, as illustrated on FIG. 9, with the mating bridge portions 7, 7a forming bridges across the outer circumferential surface of the brake disc 19 and rigidly connecting the central portions 1, 1a of the brake half-calipers 100, 100a arranged on opposite sides of the brake disc 19. This arrangement allows the brake pads 18, which are actuated by the pistons 16 supported in the central portions 1, 1a of the brake half-calipers 10, 100a, to be positioned at the opposite side surfaces of the brake disc 19.

A method of making a disc brake half-caliper, which is applicable to both the outer disc brake half-caliper 100 and the inner disc brake half-caliper 100a, and which uses casting mold with an internal portion defining the central portion 1/1a, at least one cylindrical recess 2/2a formed in the central portion and configured to support a piston for movement in the axial direction, a pair of bridge portions (i.e., two bridge portions) 7/7a formed on opposite sides of the central portion 1/1, each of the bridge portions 7/7a extending further in the axial direction toward a first side than the central portion 1/1a and terminating on the first side at a flat surface 9/9a perpendicular to the axial direction, and at least one cavity 6/6a in each of the flat surfaces 9/9a, will now be described.

FIGS. 1 and 5 show, in the illustrated embodiment, the gate location 35/35a at which gates of the casting mold supply the molten iron to the areas of the casting mold defining the bridge portions 7/7a. Furthermore, gate location 36/36a is the location at which a gate of the casting mold supplies molten iron to the area of the casting mold defining the central portion 1. Note that those figures illustrates portions of the half-calipers 100/100A themselves after removal from the casting mold, and so the gates themselves are not illustrated.

Figure 12:
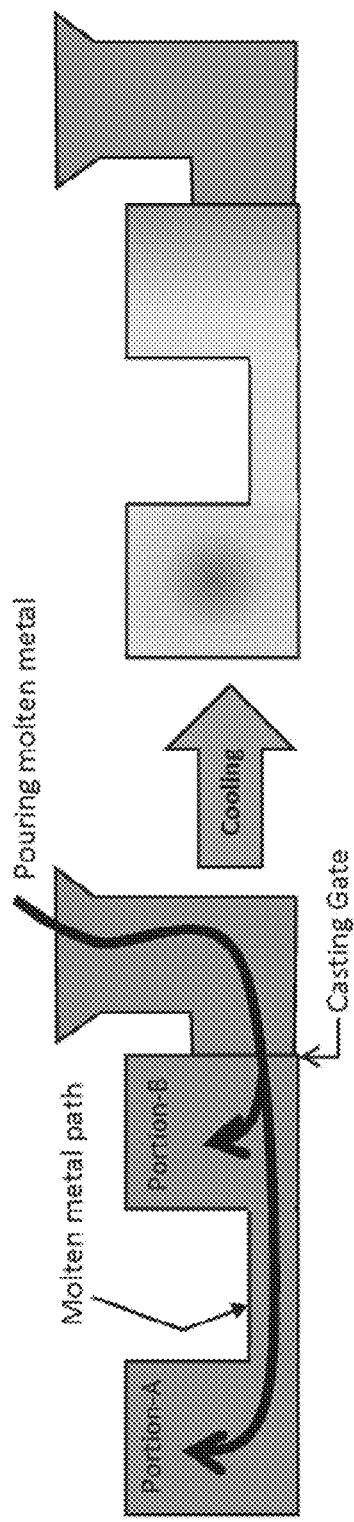
FIG. 12 illustrates the solidification profile of casting of a bridge portion of a disc brake half-caliper according to a comparative example.
Figure 11:
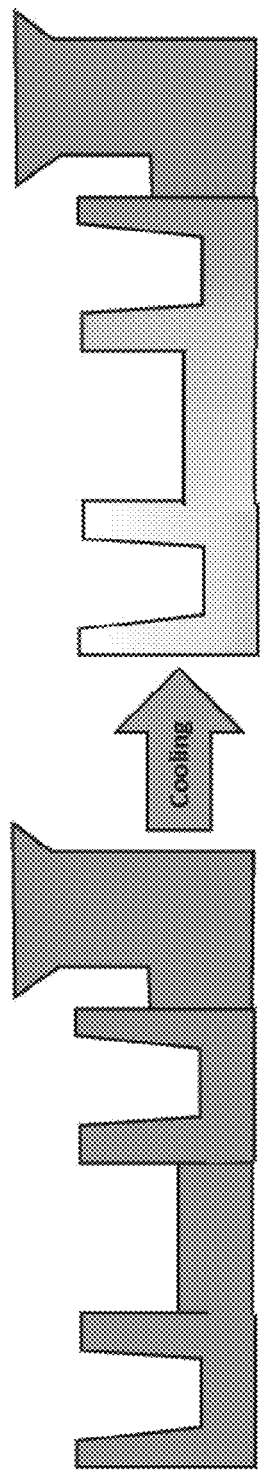
FIG. 11 illustrates the solidification profile of casting of a bridge portion of a disc brake half-caliper according to an embodiment.

In known iron casting processes, it has been found that there can be porosity in the portion of the molten iron which solidifies last due to shrinkage of the iron upon solidification. In this regard, the provision of cavities 6/6a on the bridge portions 7/7a allows the molten iron which flows into the portions of the casting mold forming the bridge portions 7/7a to flow relatively linearly through thin-walled sections which exist due to the presence of the cavities. Thus, as illustrated in FIG. 11, in which the earlier solidification is lighter in shade and the later solidification is darker in shade, the molten iron will solidify in an area of the casting mold defining at least one of the pair of bridge portions 7/7a before solidifying in an area of the resultant casting directly adjacent to the gate 35/35a, and porosity issues with the last-to-solidify iron can thus be avoided. By contrast, if, in an effort to remove material from the bridge portions 7/7a, separate large mass areas of the bridge portions 7/7a remain, restricted flow into the portion of the casting mold corresponding to at least one of the relative large mass areas may occur during casting of such a bridge portion 7/7a. During such a casting process, as illustrated in FIG. 12 including Portions A and B as large mass areas, in which the earlier solidification is lighter in shade and the later solidification is darker in shade, the center of such a large mass area may cool after its outer portions, resulting in the molten iron in the center of such a large mass area being last to solidify. Such an area would be at risk of unacceptably high weakening due to the resulting increased porosity.

Turning back to the method, after the iron has suitably cooled, the through holes are 11/11a are formed, such as by drilling, in the bridge portions 7/7a. As discussed above, the through holes 11/11a are positioned to extend through the bridge portions 7/7a in the axial direction and open at the bottoms 13/13a of the cavities 6/6a. Additional processing, such as forming the internal fluid passageways 14/14a and providing the pistons and associated seals, is also performed after the iron forming the half-brake calipers 100/100a has cooled.

Figure 10:
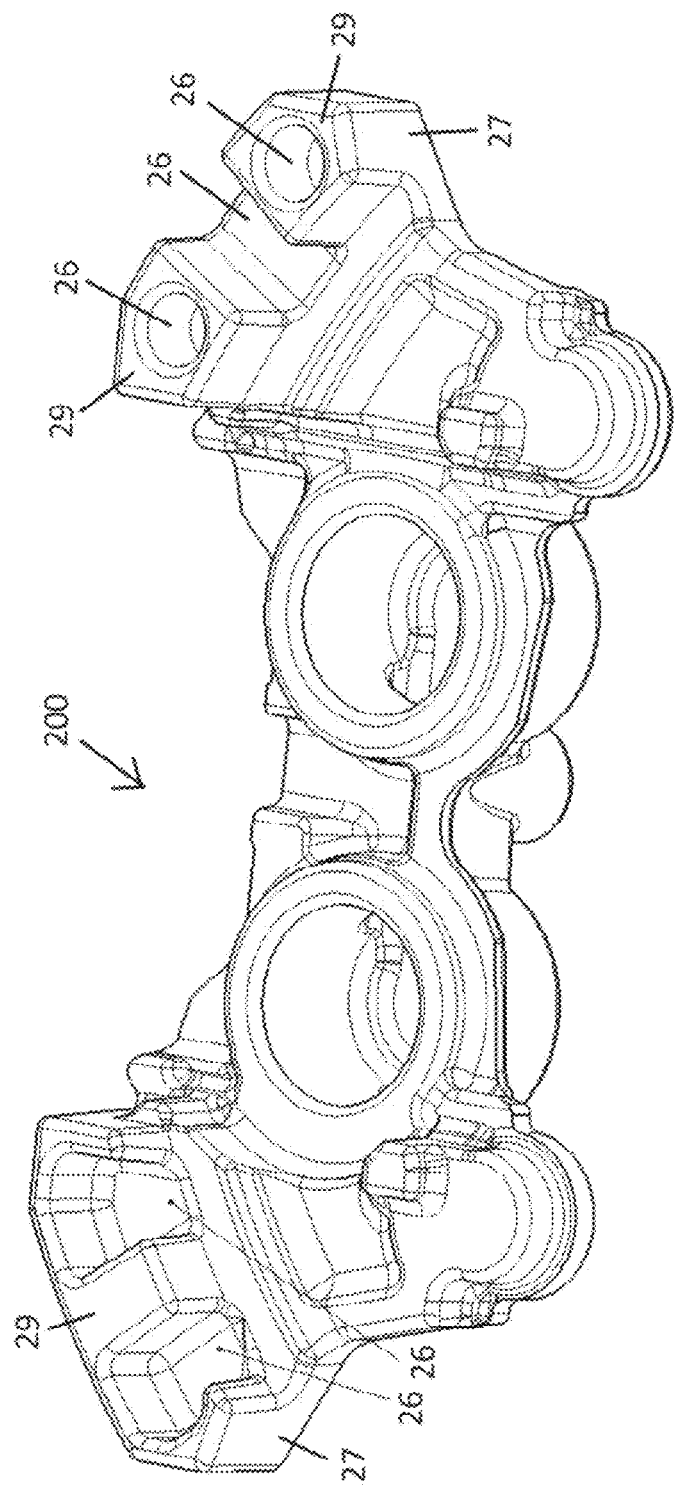
FIG. 10 illustrates a disc brake half-caliper after casting and prior to machining.

In the half-calipers 100/100a illustrated in FIGS. 1-8, the outermost perimeters of the flat surfaces 9/9a of the bridge portions 7/7a are unbroken by any of the cavities. Accordingly, in the caliper formed by the half-calipers, a closed chamber, within which the bolts 15 will run, is provided. In an alternative embodiment half caliper 200, as illustrated in FIG. 10, the outermost perimeters of the surfaces 29 of the bridge portions 7 are broken by at least one of the cavities 26 of each bridge portion 7. In this arrangement, a closed space is not formed by the cavities 26 of the mating half calipers, and so additional measures for mitigating corrosion resistance of the bolts 15 may be needed. However, the other advantages discussed above can still be achieved in such an alternative as long as there remains enough perimeter for the bridge portions 7 to be sufficiently stiff. Furthermore, FIG. 10 illustrates the half-caliper after casting but before further processing, including machining of the cylindrical recesses to their final shape and of the surfaces 29 to their final flat shape, and of drilling the through holes and fluid passageways, has taken place.

The detailed description above describes a brake half-caliper, a brake caliper made from two such brake half-calipers, and a method of making the brake half-calipers. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A disc brake half-caliper, comprising:
at least one cylindrical recess formed in a central portion of the half-caliper, the at least one cylindrical recess configured to support a piston for movement in an axial direction;
a pair of bridge portions formed on opposite sides of the central portion, each of the bridge portions extending further in the axial direction toward a first side of the disc brake half caliper than the central portion;
each of the bridge portions defining at least one through hole extending therethrough in the axial direction and configured to be disposed radially outside an outer circumferential surface of a brake disc forming part of a disc brake including the disc brake half-caliper;
at least one of the bridge portions terminating on the first side at a flat surface perpendicular to the axial direction, and having at least one cavity formed in the flat surface with a bottom at which the at least one through hole opens;
the flat surface of the at least one of the bridge portions having an outermost perimeter unbroken by any of the at least one cavities of the at least one of the bridge portions;
wherein the at least one of the bridge portions has a single cavity formed in the flat surface and a pair of through holes opening at the bottom of the single cavity.

2. A disc brake half-caliper, comprising:
at least one cylindrical recess formed in a central portion of the half-caliper, the at least one cylindrical recess configured to support a piston for movement in an axial direction;
a pair of bridge portions formed on opposite sides of the central portion, each of the bridge portions extending further in the axial direction toward a first side of the disc brake half caliper than the central portion;
each of the bridge portions defining at least one through hole extending therethrough in the axial direction and configured to be disposed radially outside an outer circumferential surface of a brake disc forming part of a disc brake including the disc brake half-caliper;
at least one of the bridge portions terminating on the first side at a flat surface perpendicular to the axial direction, and having at least one cavity formed in the flat surface with a bottom at which the at least one through hole opens;
the flat surface of the at least one of the bridge portions having an outermost perimeter unbroken by any of the at least one cavities of the at least one of the bridge portions;
wherein one of the bridge portions has a single cavity formed in the flat surface and a pair of through holes opening at the bottom of the single cavity, and
an other of the bridge portions has at least two cavities formed in the flat surface and at least two respective through holes each opening at the bottom of a respective one of the at least two cavities.

3. A disc brake caliper, comprising:
an inner disc brake half-caliper and an outer disc brake half-caliper, each of the inner and outer disc brake half-calipers comprising:
at least one cylindrical recess formed in a central portion of the half-caliper, the at least one cylindrical recess configured to support a piston for movement in an axial direction;
a pair of bridge portions formed on opposite sides of the central portion, each of the bridge portions extending further in the axial direction toward a first side of the disc brake half caliper than the central portion;
each of the bridge portions defining at least one through hole extending therethrough in the axial direction and configured to be disposed radially outside an outer circumferential surface of a brake disc forming part of a disc brake including the disc brake half-caliper;
at least one of the bridge portions terminating on the first side at a flat surface perpendicular to the axial direction, and having at least one cavity formed in the flat surface with a bottom at which the at least one through hole opens;
the flat surface of the at least one of the bridge portions having an outermost perimeter unbroken by any of the at least one cavities of the at least one of the bridge portions;
the disc brake caliper further comprising a plurality of bolts, each of the plurality of bolts extending through one of the through holes in the inner disc brake half-caliper and one of the through holes of the outer disc brake half-caliper;

the flat surface of the at least one of the bridge portions of the outer disc brake half-caliper being in contact and with the flat surface of the at least one of the bridge portions of the inner disc brake half-caliper;

wherein the at least one of the bridge portions of the inner disc brake half-caliper has a single cavity formed in the flat surface and a pair of through holes opening at the bottom of the single cavity.

4. A disc brake caliper, comprising:

an inner disc brake half-caliper and an outer disc brake half-caliper, each of the inner and outer disc brake half-calipers comprising:
- at least one cylindrical recess formed in a central portion of the half-caliper, the at least one cylindrical recess configured to support a piston for movement in an axial direction;
- a pair of bridge portions formed on opposite sides of the central portion, each of the bridge portions extending further in the axial direction toward a first side of the disc brake half caliper than the central portion;
- each of the bridge portions defining at least one through hole extending therethrough in the axial direction and configured to be disposed radially outside an outer circumferential surface of a brake disc forming part of a disc brake including the disc brake half-caliper;
- at least one of the bridge portions terminating on the first side at a flat surface perpendicular to the axial direction, and having at least one cavity formed in the flat surface with a bottom at which the at least one through hole opens;

the flat surface of the at least one of the bridge portions having an outermost perimeter unbroken by any of the at least one cavities of the at least one of the bridge portions;

the disc brake caliper further comprising a plurality of bolts, each of the plurality of bolts extending through one of the through holes in the inner disc brake half-caliper and one of the through holes of the outer disc brake half-caliper;

the flat surface of the at least one of the bridge portions of the outer disc brake half-caliper being in contact and with the flat surface of the at least one of the bridge portions of the inner disc brake half-caliper;

wherein the at least one of the bridge portions of the outer disc brake half-caliper has a single cavity formed in the flat surface and a pair of through holes opening at the bottom of the single cavity.

* * * * *